United States Patent [19]

Richter

[11] Patent Number: 4,853,841

[45] Date of Patent: Aug. 1, 1989

[54] ARRANGEMENT FOR THE INDIVIDUAL ADAPTATION OF A SERIAL INTERFACE OF A DATA PROCESSING SYSTEM TO A DATA TRANSMISSION SPEED OF A COMMUNICATION PARTNER

[75] Inventor: Axel Richter, Wimsheim, Fed. Rep. of Germany

[73] Assignee: Dr. Ing. h.c.F. Porsche Aktiengesellschaft, Stuttgart, Fed. Rep. of Germany

[21] Appl. No.: 920,454

[22] Filed: Oct. 20, 1986

[30] Foreign Application Priority Data

Oct. 22, 1985 [DE] Fed. Rep. of Germany ....... 3537477

[51] Int. Cl.⁴ ..................... H04L 25/40; H04L 7/00; G06F 3/00
[52] U.S. Cl. .................................................. 364/200
[58] Field of Search ... 364/200 MS File, 900 MS File

[56] References Cited

U.S. PATENT DOCUMENTS

| 3,602,900 | 8/1971 | Delaigue et al. | 364/200 |
| 3,962,541 | 6/1976 | Seidel | 178/69.5 R |
| 4,129,748 | 12/1978 | Saylor | 358/141 |
| 4,227,178 | 10/1980 | Gergaud et al. | 364/900 |
| 4,338,677 | 7/1982 | Morrill, Jr. et al. | 364/900 |
| 4,458,308 | 7/1984 | Holtey et al. | 364/200 |
| 4,490,821 | 12/1984 | Lacher | 364/900 |
| 4,507,732 | 3/1985 | Catiller et al. | 364/200 |
| 4,509,121 | 4/1985 | Rey et al. | 364/200 |

FOREIGN PATENT DOCUMENTS

| 0091200 | 10/1983 | European Pat. Off. . |
| 2261257 | 7/1973 | Fed. Rep. of Germany . |
| 2355533 | 5/1974 | Fed. Rep. of Germany . |
| 2617222 | 11/1976 | Fed. Rep. of Germany . |
| 2628581 | 12/1976 | Fed. Rep. of Germany . |
| 2719309 | 11/1977 | Fed. Rep. of Germany . |
| 2710270 | 5/1978 | Fed. Rep. of Germany . |
| 2748075 | 5/1979 | Fed. Rep. of Germany . |
| 3124163 | 12/1982 | Fed. Rep. of Germany . |
| 58-140840 | 2/1982 | Japan . |

OTHER PUBLICATIONS

"Use ICs in Your Phase-Locked Loop", Electronic Design, Apr. 1968, pp. 76–80.
"Electronic Communications", Third Edition, 1984, pp. 221–224.
"Data-Comm, Telecomm. ICs-Moving to Single Chips and More Intelligence", Electronic Design, vol. 31, Apr. 1983, pp. 93–104.
"68000 Peripheral Chips Assume I/O Tasks & More", Electronic Design, vol. 31, Oct. 1983, pp. 123–128.

Primary Examiner—Gary V. Harkcom
Assistant Examiner—Christopher H. Lynt
Attorney, Agent, or Firm—Barnes & Thornburg

[57] ABSTRACT

An arrangement, for adapting the serial interface of a data processing system to the data speed of a communication partner, has a recognition circuit for recognizing the transmission speed wherein signals from the communication partner having the unknown transmission speed are inputted to a frequency counter of the recognition circuit and the resulting count provided to a microprocessor which calculates an adjustment division signal N from the counting results. The adjustment divison signal N is inputted to a frequency divider of a phase lock loop (PLL) circuit of an adjustment circuit to provide a divided clock frequency signal which is compared with a divided reference frequency signal by the PPL circuit so that the frequency of a voltage control oscillator of the PLL circuit is adjusted until the divided clock frequency signal and divided reference frequency signal are equal. The adjusted voltage control oscillator signal is inputted to the microprocessor from which a matching data transmission speed equal to the data transmission speed of the communication partner is calculated.

20 Claims, 2 Drawing Sheets

ARRANGEMENT FOR THE INDIVIDUAL ADAPTATION OF A SERIAL INTERFACE OF A DATA PROCESSING SYSTEM TO A DATA TRANSMISSION SPEED OF A COMMUNICATION PARTNER

BACKGROUND AND SUMMARY OF THE INVENTION

The present invention relates to an arrangement for adapting a serial interface of a data processing system to the data transmission speed of a communication partner.

Individual data processing systems of a computer network system frequently have different clock frequencies and resulting data transmission speeds. One of the main reasons is that the components of the computer network system partly operate using completely different microprocessors of varied manufacturers. The communication of these individual data processing systems with one another via serial interfaces, however, requires all communication partners to be adapted to use the same data transmission speed.

In German Patent No. 23 55 533 and German Published Unexamined Patent Application No. 31 24 163, receivers for data signals were suggested that have a change detector for the data transmission speed. A disadvantage of these systems is that the different data transmission speeds of the communication partners must be known and for each occurring data transmission speed a separate recognition circuit is required.

In order to avoid these disadvantages, the circuit for the retrieval of clock pulses according to German Published Unexamined Patent Application No. 26 28 581 uses a circuit arrangement that can adjust itself individually to data transmission speeds in a frequency range of 1:8. This frequency range is, however, relatively narrow and is suitable only for the adaptation to fluctuations around a fixed frequency. In addition, the circuit arrangement has an enormous number of assemblies and components and requires many expensive analog components, such as collators, filters, etc., so that during manufacturing/servicing extensive compensating measures are required. Therefore, a good long-term stability can hardly be expected.

Based on the above state of the art, it is an objective of the present invention to provide an arrangement for the individual adaptation of a serial interface of a data processing system to the data transmission speed of a communication partner that has the advantage of a simple construction of largely digital components and permits a simple, fast, secure, and exact adjustment over a wide frequency range, of the data processing system to the data transmission speed.

This and other objects are achieved in the present invention by providing, in an arrangement for adapting a serial interface of a data processing system to the data transmission speed of a communication partner, a recognition circuit for recognizing the data speed. A microprocessor controls the recognition circuit and a clock frequency generator outputs a clock frequency signal to the microprocessor. An adjustment circuit adjusts the clock frequency generator to produce an adjusted clock frequency signal which corresponds to a matching data transmission speed which matches the data transmission speed from the communicating partner. A derivation circuit in the microprocessor derives the matching data transmission speed from the adjusted clock frequency signal.

Advantages of the invention are that an arrangement for the individual adaptation of a serial interface of a data processing system to a data transmission speed of a communication partner is provided that has a simple construction from largely digital components. It also ensures a wide frequency range of 1:200 or more, and an exact, fast and secure adjustment of the interface to the data transmission speed of the communication partner without an extensive control procedure Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
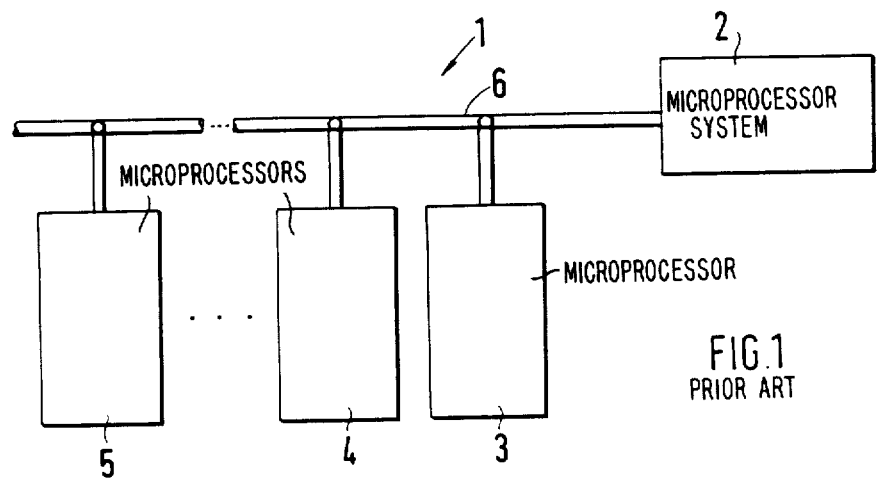
FIG. 1 is a block diagram of a computer network system.

In FIG. 1, reference number 1 schematically shows a computer network system comprising microprocessor systems in which a first microprocessor system 2 is connected with other microprocessor systems 3 to 5 via a bus system 6. The microprocessor systems 2 to 5 exchange data with one another via the bus system 6.

The following example of a preferred embodiment uses an asynchronous serial bus system 6, where the first microprocessor system 2 is a superset system that extracts data from other microprocessors 3 to 5 via the serial bus 6. It is also contemplated to use the arrangement with synchronous data transmission.

Microprocessor systems of the type illustrated are frequently equipped with completely different microprocessors, particularly if the microprocessor systems are furnished by different manufacturers companies. They often operate with clock frequencies that are different from one another, and their interfaces rarely have a uniform transmission speed. Therefore, the superset first microprocessor system 2 therefore requires an arrangement by which it can adjust itself to the individual transmission speeds of the respective communicating partners.

Figure 2:
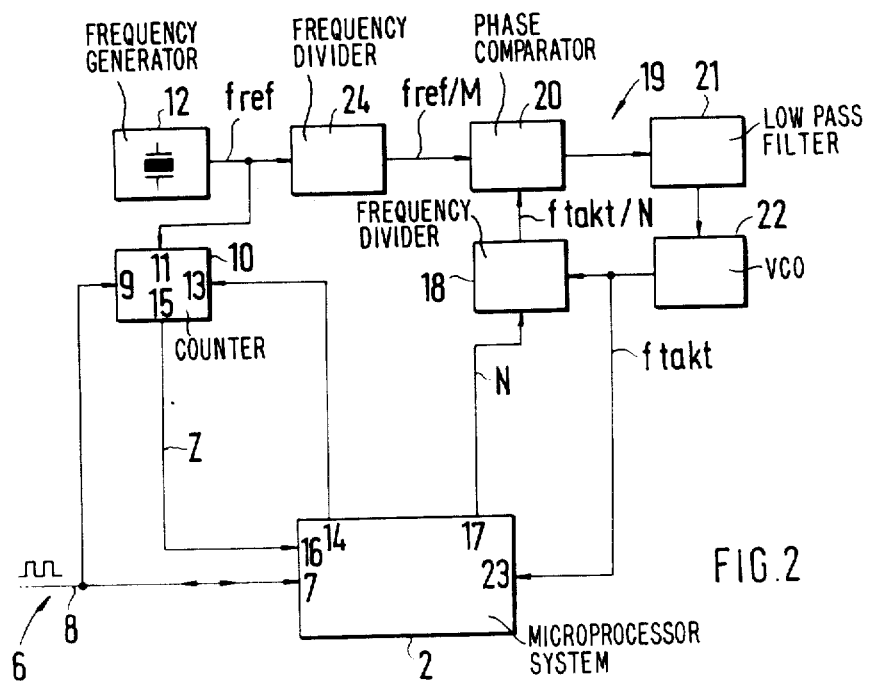
FIG. 2 is a schematic, block diagram of a preferred embodiment of the present invention.

An arrangement of this type is shown in FIG. 2. The first microprocessor system 2 has a serial interface (not shown) which is connected by the input/output port 7 to a signal line 8 of the serial bus system 6.

The first microprocessor system 2 is, for example, set up in a configuration comprising the microprocessor, volatile (RAM) and nonvolatile (ROM) memory chips, the serial interface and parallel input/output chips as well as other chips required for their operation. It is also contemplated to provide all these functions in a one-chip system. Since these are generally known, they will not be discussed in detail. Also, for reasons of clarity, a power supply is not shown and neither are individual lines of multiwire connections.

The signals arriving on the signal line 8 are connected to an input 9 of a counter 10 (such as a binary counter). The counting input 11 of counter 10 is acted upon by pulses of a reference frequency signal "fref" that is generated by a reference frequency signal generator 12. The counter 10 can also be controlled by a control input 13 and/or set back by the microprocessor system 2 (output 14). The counter result Z is made available via a counter output 15 to an input 16 of the microprocessor system 2 for further processing.

A signal N is outputed at an output 17 of the microprocessor system 2. A first division ratio 1/N of a first frequency divider 18 is adjusted within a phase locking loop 19 by this signal N. The phase locking loop 19 has a phase comparator 20, a lowpass filter 21 and a voltage controlled oscillator (VCO) 22, that are connected together in a loop with the first frequency divider 18.

The voltage-controlled oscillator 22 generates a clock pulse "ftakt" that acts upon the microprocessor system 2 through clock frequency input 23. The pulse "ftakt" is divided by the first frequency divider 18 at the ratio 1/N and is fed to the phase comparator 20 where it is compared with a frequency pulse "fref" divided by a second firmly adjusted frequency divider 24 at a ratio 1/M to provide a signal "fref"/M. The output quantity of the phase comparator 20, after higher-frequency fractions, are filtered by the lowpass filter 21, is used as the drive signal for the voltage controlled oscillator 22.

The operation of the arrangement is as follows: When a rectangular pulse arrives on the signal line 8, the counter 10 is started and is stopped again at the end of the rectangular pulse. It is not important whether the starting process takes place by means of level detection (exceeding of a certain signal level) or edge triggering (detection of a rising or falling signal edge). With the starting of the counter 10, pulses of the reference signal "fref" of the reference frequency generator 12 operating with a highly exact quartz time base are counted. After the counter has stopped, at the end of the rectangular pulse, the counting result is read out by the first microprocessor 2.

So that the data transmission speed can be determined precisely, it is useful if the actual data transmission from the communication partner is a data signal prefixed with a special bit pattern which is particularly suitable for this purpose. It was found to be advantageous for the bit pattern to be represented as a rectangular signal. Naturally, it is also possible to determine the data transmission speed from a normal data transmission signal. However, for this purpose, the measuring of a whole series of pulses is required as well as a special program routine of the microprocessor system 2 that determines the "correct" pulse length (i.e., the time period for the transmission of one signal bit).

Since the quartz time base or the reference frequency is known, the data transmission speed (v) can be determined by the microprocessor system 2 from the counting result Z and from that, the first division ratio 1/N is determined. As an alternative, the microprocessor system 2, from a table stored in a memory area, can read out directly a value for the signal N of the first division ratio 1/N and output it to the first frequency divider 18. This value corresponds to a previously determined counting result Z. The counting result Z can therefore be used directly or indirectly as an address for this memory area.

The voltage-controlled oscillator 22 subsequently will be controlled by the phase comparator 20 of the phase lock loop 19 such that an equilibrium occurs at its inputs:

$$ftakt/N = fref/M,$$

so that the following is true:

$$ftakt = (N/M) * fref.$$

The division ratio 1/M at the second frequency divider 24 is fixed. It determines the frequency increments by which the clock frequency signal "ftakt" can be adjusted. It is fixed such that by means of a programmable, interger value of N, a suitable clock frequency "ftakt" is adjusted. From this adjusted clock frequency "ftakt", the desired transmission speeds v' can be derived with a required precision by integer division so that the microprocessor system can therefore be synchronized with the communication partner.

When the system is started or restarted, it is necessary to first adjust the first division ratio 1/N. This is so that the first microprocessor system 2, if it has a joint system clock for the microprocessor and the serial interface can be admitted with a clock frequency signal "ftakt" required for its operation. This is necessary because an operation of the phase locking loop 19 is not possible without adjusting a first division ratio 1/N unless the voltage-controlled oscillator 22 is designed to be self-starting and can generate a clock frequency signal "ftakt" from a frequency band that is at least limited in downward direction, also in the uncontrolled state. The clock frequency signal "ftakt" will then assume a frequency at a lower frequency limit.

In certain preferred embodiments, the clock frequency signal "ftakt" is used as the system clock for the first microprocessor 2. It is also contemplated to instead provide a separate system clock generator for the microprocessor 2. Also, it is contemplated to use the clock frequency signal "ftakt" as the system clock for the data transmission of the serial interface of the first microprocessor 2, so that the reference signal generator functions as the system clock generator for the first microprocessor 2.

Figure 3:
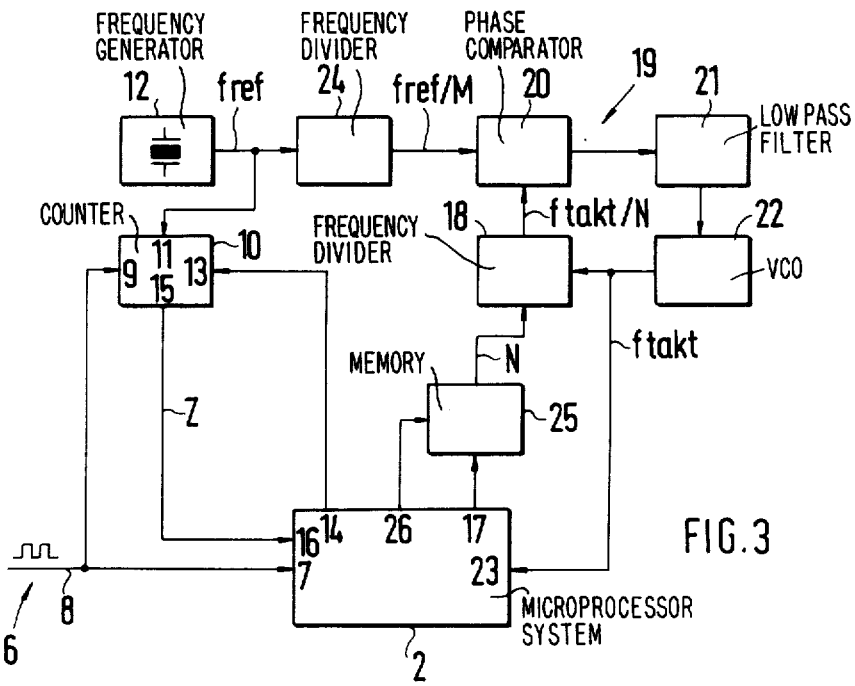
FIG. 3 is a schematic, block diagram of an alternate preferred embodiment of the present invention.

As shown in the further preferred embodiment of FIG. 3, an additional memory unit 25 is connected between the output 17 of the microprocessor system 2 and the input for adjusting the division ratio 1/N at the first frequency divider 18. It is also contemplated to integrate this memory unit 25 into the frequency divider 18 of the microprocessor system 2. The additional memory unit 25, via a control output 26 of the microprocessor system 2, is controlled by means of a conventional initialization circuit and outputs. As long as there is no new counting result Z from the counter 10, it outputs a certain division ratio 1/N start. It is also contemplated that this ratio 1/N start be the last adjusted ratio before the switching-off of the microprocessor system 2.

In a microprocessor system 2 in which only the data transmission of the serial interface is supplied with the clock frequency signal "ftakt", and the microprocessor of the microprocessor system 2 is equipped with its own system clock generator, an additional memory unit 25 for the intermediate storage of the first division ratio 1/N or a corresponding initialization circuit are not required. This is because the microprocessor starts automatically and the first division ratio 1/N can be outputted in its initialization phase or after the first measurement of the data transmission speed v. The system clock generator in this case may be identical with the reference frequency generator 12. This is shown in FIG. 4 as a broken-line connection from the reference frequency generator 12 to a clock input 27 of the microprocessor system 2.

Figure 4:
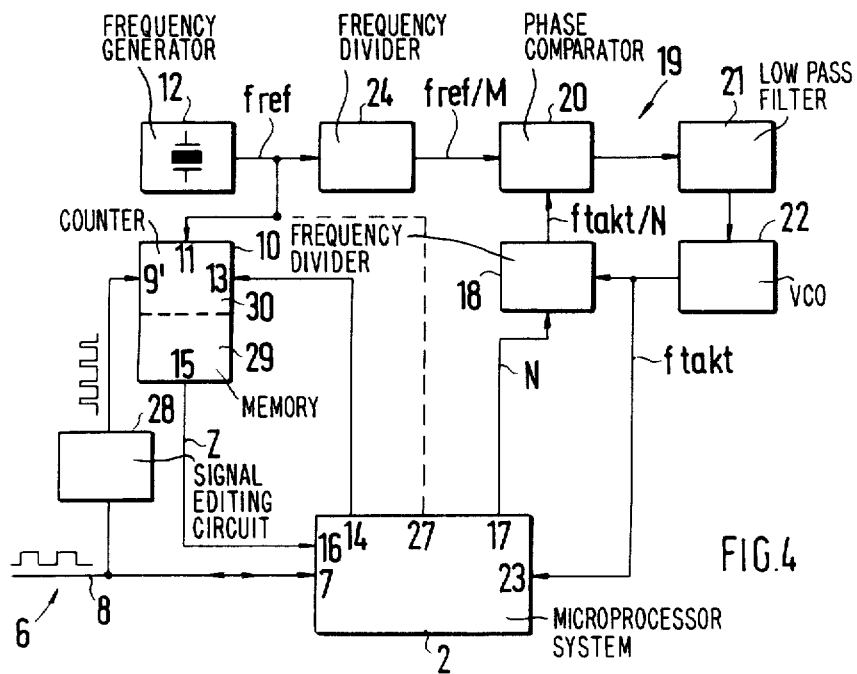
FIG. 4 is a schematic, block diagram of a further alternate preferred embodiment of the present invention.

In the further preferred embodiment illustrated in FIG. 4, an additional signal editing circuit 28 is provided between the data line 8 and the counter 10 which changes the pulse edges of the rectangular signal into control pulses of a defined shape, such as may, for example, be indicated by a specification of the counter 9'.

In this embodiment, the counter 10 has a memory 29 for the intermediate storage of a counting result. The counter 10 is subdivided into a memory part 29 and a counter and control part 30. By a control pulse at the input 9', an instantaneous counting result is moved over into a memory of the memory part 29, in which case the counter continues to run without interference and a higher measuring precision is obtained.

It has been found that bits of different logic states in one complete cycle often have different pulse lengths. In other words, the cycle does not have a 50% duty cycle. To account for this, it is contemplated to count the pulses of the reference signal "fref" during at least two successive bits with different logic states which constitutes a cycle in order to determine an accurate data transmission speed v. The at least two successive bits corresponds to at least one complete rectangle oscillation. Also, a measurement of the data transmission speed (v) can be improved by determining the mean value of several measurements. For this purpose, the microprocessor system 2 processes at least two successive measuring results.

It should be pointed out that in the case of equal communication partners, i.e., microprocessor systems each of which can extract data from any other partner, each communication partner can be equipped with an arrangement of this type so that a problem-free communication is made possible, and each transmitting microprocessor system can use any intrinsic transmission speed.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An arrangement for adapting a serial interface of a data processing system to a data transmission speed of data transmission signals from a communication partner, comprising:
   (a) recognition circuit means for recognizing said data transmission speed including:
      (i.) reference frequency generator means for generating a reference frequency signal;
      (ii.) counter means controlled by said data transmission signals from said communication partner for counting pulses of said reference frequency signal;
      (iii.) reading means in a microprocessor means for reading from said counter means a counting result of said counting of pulses; and
      (iv.) logic means for providing an adjustment division signal to an adjustment means based on said counting results;
   (b) said microprocessor means being connected to said recognition circuit means for controlling said recognition means;
   (c) clock frequency generating means connected to said microprocessor means for outputting a clock frequency signal to said microprocessor means;
   (d) adjustment means for adjusting said frequency clock generating means to produce an adjusted clock frequency signal which corresponds to a matching data transmission speed which matches said data transmission speed wherein said adjustment means includes a phase locking loop including:
      (i.) voltage controlled oscillator means as said clock frequency generating means for generating said clock frequency signal;
      (ii.) first frequency divider means for dividing said clock frequency signal in a first division ratio equal to the inverse of the adjustment division signal; said first frequency divider means receiving said adjustment division signal from said microprocessor means;
      (iii.) phase comparator means for comparing said divided clock frequency signal with a divided reference frequency signal received from a second frequency divider outside said loop; and
      (iv.) a lowpass filter for filtering higher-frequency fractions from an output of said phase comparator means, and for providing the filtered output of said phase comparator to adjust said clock frequency signal of said voltage control oscillator so that said divided clock frequency signal of said voltage controlled oscillator equals said divided reference signal; and
   (e) derivation means in said microprocessor means for deriving said matching data transmission speed from said adjusted clock frequency signal.

2. An arrangement according to claim 1, wherein said second frequency divider divides said reference frequency signal in a fixed ratio, and said first frequency divider divides said clock frequency in an adjustable ratio, and said matching data transmission speed is derived from these ratios by said derivation means.

3. An arrangement according to claim 2, wherein said counter means counts said reference frequency signal pulses occurring between pulse edges of said data transmission signals.

4. An arrangement according to claim 1, including determining means for determining said data transmission speed from a data signal having a special bit pattern that is transmitted by the communication partner and is prefixed to said data transmission signal.

5. An arrangement according to claim 4, wherein said special bit pattern is a rectangular signal.

6. An arrangement according to claim 5, wherein said rectangular signal is a complete rectangular wave having at least two successive bits with different logical states, said counter means determining said data transmission speed by counting said reference frequency signal pulses during a transmission of said at least two successive bits.

7. An arrangement according to claim 6, wherein said derivation means include means for calculating a mean value from several adjusted clock frequency signals for deriving said matching data transmission speed.

8. An arrangement according to claim 7, wherein said counter means has a memory means for temporarily storing a momentary counting result, said temporary storage taking place at a point in time determined as a function of at least one of a pulse or pulse edge of said data transmission signal transmitted by the communication partner.

9. An arrangement according to claim 8, further including a signal editing circuit for changing said data transmission signal pulse edges into control pulses of a defined shape which are inputted to said counter means.

10. An arrangement according to claim 1, wherein said microprocessor means includes means for using said clock frequency signal as the system clock for said microprocessor means.

11. An arrangement according to claim 1, wherein said clock frequency signal is used only as the system clock for the data transmission of a serial interface of said microprocessor means.

12. An arrangement according to claim 11, wherein said microprocessor means has a separate system clock generator.

13. An arrangement according to claim 11, wherein said reference signal generator functions as a system clock generator for said microprocessor means.

14. An arrangement according to claim 1, including storage means in said first frequency divider for storing the first division ratio when said microprocessor means is switched off.

15. An arrangement according to claim 1, including storage means in said microprocessor means for storing the first division ratio when said microprocessor means is switched off.

16. An arrangement according to claim 1, including an additional memory unit connected between said microprocessor means and said first frequency divider for storing the first division ratio when said microprocessor means is switched off.

17. An arrangement according to claim 1, further comprising an initialization means for providing a specified division ratio to said first frequency divider when said arrangement starts after said microprocessor means has been switched off.

18. An arrangement according to claim 17, wherein said initialization means is integrated into said microprocessor means.

19. An arrangement according to claim 1, wherein said voltage control oscillator means is self-starting when an operating voltage is applied and generates said clock frequency signal in a frequency band that is at least limited in downward direction, said clock frequency signal assuming a lower limit frequency in an uncontrolled state of the voltage controlled oscillator.

20. An arrangement for adapting a serial interface of a data processing system to an unknown data transmission speed of data transmission signals from a communication partner, comprising:
  reference frequency generator means for generating a reference frequency signal;
  counter means for counting pulses of said reference frequency signal for a period set by and related to the unknown data transmission speed of said data transmission signals;
  microprocessor means connected to said counter means for reading from said counter means a counting result determined by said period set by the unknown date transmission speed of said data transmission signal and for calculating an adjustment signal based on said counting result;
  variable clock frequency generating means connected to said microprocessor means for outputting an adjustable clock frequency to said microprocessor means;
  adjustment means for receiving said adjustment signal from said microprocessor means and for adjusting said adjustable clock frequency generating means in response to said adjustment signal to produce an adjusted clock frequency signal corresponding to a matching data transmission speed which matches said unknown data transmission speed; and
  derivation means in said microprocessor means for deriving said matching data transmission speed from said adjusted clock frequency signal.

* * * * *